United States Patent
Nomura

(10) Patent No.: US 6,808,103 B2
(45) Date of Patent: Oct. 26, 2004

(54) METHOD FOR CONTINUOUS HIGH-SPEED WELDING OF DOUBLE-PLY METAL TUBES AND WELDING FURNACE FOR PERFORMING THE SAME

(76) Inventor: Yukito Nomura, 1-8-8, Chuo, Koga-shi, Ibaraki-ken, 306-0033 (JP)

( * ) Notice: Subject to any disclaimer, the term of this patent is extended or adjusted under 35 U.S.C. 154(b) by 190 days.

(21) Appl. No.: 10/246,345
(22) Filed: Sep. 17, 2002

(65) Prior Publication Data
US 2003/0015571 A1 Jan. 23, 2003

Related U.S. Application Data

(63) Continuation of application No. PCT/JP01/02089, filed on Mar. 16, 2001.

(30) Foreign Application Priority Data

Mar. 17, 2000 (JP) .......................... 2000-147062
Mar. 8, 2001 (JP) .......................... 2001-064518

(51) Int. Cl.$^7$ .............................................. B23K 31/02
(52) U.S. Cl. ..................... 228/173.7; 228/143; 228/207
(58) Field of Search ................................ 228/220, 254, 228/173.1, 173.6, 173.7, 207, 223, 143, 245–247; 138/141–144; 148/516, 519, 521; 266/107, 112, 120

(56) References Cited

U.S. PATENT DOCUMENTS

| 1,892,607 | A |   | 12/1932 | Bundy |
| 2,292,810 | A |   | 8/1942 | Woeller |
| 3,339,269 | A | * | 9/1967 | Hanink .................. 228/219 |
| 4,224,086 | A | * | 9/1980 | Stokes et al. ................ 148/26 |
| 5,447,179 | A | * | 9/1995 | Gibbs et al. ............... 138/143 |
| 5,738,723 | A | * | 4/1998 | Fleeman et al. ........... 118/67 |

FOREIGN PATENT DOCUMENTS

| JP | S32-6111 | 7/1955 |
| JP | 62-199293 | 9/1987 |
| JP | 10-277637 | 10/1998 |

OTHER PUBLICATIONS

International Search Report corresponding to International Application PCT/JP01/02089, dated Jun. 5, 2001.

International Preliminary Examination Report corresponding to International Application PCT/JP01/02089, Dated Mar. 7, 2003.

* cited by examiner

Primary Examiner—Kiley Stoner
Assistant Examiner—Kevin L McHenry
(74) Attorney, Agent, or Firm—Alston & Bird LLP

(57) ABSTRACT

The present invention is a method and apparatus for making a double-ply metal tube such as those used for automobile brake tubes by producing the tube continuously in a single process. The present invention is characterized by using a high-temperature reducing molten salt with high heat capacity as the heating medium, whereby the welding speed can be increased and the balance with the tube-making speed can be kept.

2 Claims, 1 Drawing Sheet

METHOD FOR CONTINUOUS HIGH-SPEED WELDING OF DOUBLE-PLY METAL TUBES AND WELDING FURNACE FOR PERFORMING THE SAME

CROSS REFERENCE TO RELATED APPLICATIONS

This is a continuation application of PCT/JP01/02089, filed Mar.16, 2001, which is incorporated herein by reference in its entirety. The present application also claims the benefit of Japanese Patent Application No. 2000-147062, filed Mar. 17, 2000 and Japanese Patent Application 2001-064518, filed Mar. 8, 2001.

TECHNICAL FIELD

The present invention relates to a method for continuous high-speed welding of double-ply metal tubes, in particular double-ply metal tubes that are used for brake tubes of automobiles or the like, and to a welding furnace for performing the same.

BACKGROUND ART

Thin band steel of for example about 0.34 mm thickness that has been subjected to copper plating of about 3 μm on both sides is wound into a coil of about 2,500 to 3,000 m length and is made into a double-ply tube with a tube-making apparatus (U.S. Pat. No. 2,292,810). This is then cut into pieces of 30 to 50 m length, then 40 to 50 such pieces arranged in parallel are fed horizontally into a welding furnace from the front of the furnace, and the overlapping surfaces of the double-ply metal tubes (metal tubes having multi-ply walls) are copper brazed (Japanese Patent Publication No. S32-6111, U.S. Pat. No. 1,892,607). Then, the steps that have been performed conventionally are passing the pieces through an eddy current flaw detector to confirm the quality of the welding and whether there are defects at the tube circumference, discard defect tubes, and, if necessary, cut the pieces to suitable dimensions to obtain the product.

In this method, the tube-making speed of the tube-making apparatus is fast, at for example 150 m/min for a tube diameter of 4.76 mm, whereas the throughput speed of the welding furnace is slow at 3 to 4 m/min. Consequently, in order to keep the balance of the production steps and to rationalize the production, the tubes are cut into pieces of 30 to 50 m length, and are welded by passing them horizontally through the welding furnace, with 40 to 50 pieces arranged in parallel. In this situation, a broad space for arranging the tubes as well as operators are needed. Furthermore, in order to let the tubes advance smoothly, guide pipes, for example muffle pipes (heat-resistant pipes), are arranged inside the welding furnace, and the tubes are fed into the furnace by inserting them into the pipes. When the muffle pipes are used over extended periods of time, they bend due to thermal stress and hinder the advancement of the tubes, so that due to speed non-uniformities, defects occur in the welding. Furthermore, a space for putting down the tubes coming from the welding furnace as well as operators for collecting them and inserting them one by one into the eddy current flaw detector are needed.

DISCLOSURE OF THE INVENTION

The present invention provides a welding method and a welding furnace that solve these problems.

One aspect of the present invention is a method for continuous high-speed welding of double-ply metal tubes, characterized in that, using at least one neutral or reducing molten salt selected from $BaCl_2$, mixtures of $BaCl_2$ with $MgF_2$, mixtures of $BaCl_2$ with $MgF_2$ and $B_2O_3$, and mixtures of $BaCl_2$ with one or more of NaCl, $MgF_2$ and $B_2O_3$ and Ca—Si as a heating medium, a step of immersing a double-ply metal tube is performed while maintaining this molten salt bath at 900 to 1200° C.

Furthermore, an aspect of the present invention is a method for continuous high-speed welding of double-ply metal tubes including a step of forming a double-ply metal tube by feeding a strip-shaped metal material that has been subjected to metal plating on both sides into a tube-making apparatus, a step of feeding the formed double-ply metal tube into a continuous heating furnace with a neutral or reducing molten salt as the heating medium, and, in the furnace, immersing a double-ply metal tube into a molten salt bath of 900 to 1200° C. using at least one neutral or reducing molten salt selected from the group of $BaCl_2$ and mixtures of $BaCl_2$ with one or two or more of NaCl, $MgF_2$, $B_2O_3$ and Ca—Si, a step of feeding the double-ply metal tube that has left the continuous heating furnace into a high-temperature auxiliary furnace with a reducing atmosphere and eliminating a chloride thin film adhering to the circumference of the metal tube, and a step of cooling the resulting double-ply metal tube.

Moreover, an aspect of the present invention is a furnace for continuous high-speed welding of double-ply metal tubes, characterized in that downstream from a pipe-making apparatus for double-ply metal pipes, a continuous heating furnace with a neutral or reducing molten salt as a heating medium, a high-temperature auxiliary furnace filled with a reducing gas, and a cooling device with which that auxiliary furnace is furnished are provided in that order, wherein the neutral or reducing molten salt is at least one selected from the group of $BaCl_2$ and mixtures of $BaCl_2$ with one or two or more of NaCl, $MgF_2$, $B_2O_3$ and Ca—Si, and this molten salt bath is kept at 900 to 1200° C.

The heating medium for welding furnaces that is used conventionally is reducing gas, e.g. DX gas, and its heat capacity is low. When it is replaced with a neutral or reducing molten salt in accordance with the present invention, the throughput speed of the welding furnace can be increased rapidly, because the heat capacity of the molten salt is high, improving the balance between the speeds of the tube-making apparatus and the welding furnace, and by providing the furnace with a suitable length, there is no need to cut the tubes into small pieces before feeding them into the furnace as described above, and a continuous integrated production becomes possible, with decreased factory space and reduced number of operators.

As long as the molten salt is non-oxidizing and has a large heat capacity, any kind is suitable.

Preferable are $BaCl_2$ (melting point 962° C., boiling point 1560° C., specific heat capacity 0.27), a mixture of 95% $BaCl_2$ and 5% $MgF_2$ (melting point 962° C., boiling point 1560° C., specific heat capacity 0.27), a mixture of 94% $BaCl_2$, 5% $MgF_2$ and 1% $B_2O_3$ (melting point 1000° C., boiling point 1560° C., specific heat capacity 0.27), a mixture of $BaCl_2$ with NaCl, a mixture of $BaCl_2$ with NaCl and $MgF_2$, a mixture of $BaCl_2$ with NaCl, $MgF_2$ and $B_2O_3$, a mixture of $BaCl_2$ with NaCl, $MgF_2$, $B_2O_3$ and Ca—Si, and these compositions are as shown in Table 1.

TABLE 1

| | |
|---|---|
| $BaCl_2$ | 90 to 100% |
| NaCl | 0 to 10% |
| $MgF_2$ | 0 to 5% |
| $B_2O_3$ | 0 to 2% |
| Ca—Si | 0 to 5% |

Furthermore, the high-temperature auxiliary furnace filled with reducing gas is for making the tube temperature uniform and for eliminating chloride thin films adhering to the circumference of the tube when it is passed through the molten salt bath, and the cooling device is for cooling the tube.

BEST MODE FOR CARRYING OUT THE INVENTION

Figure 1:
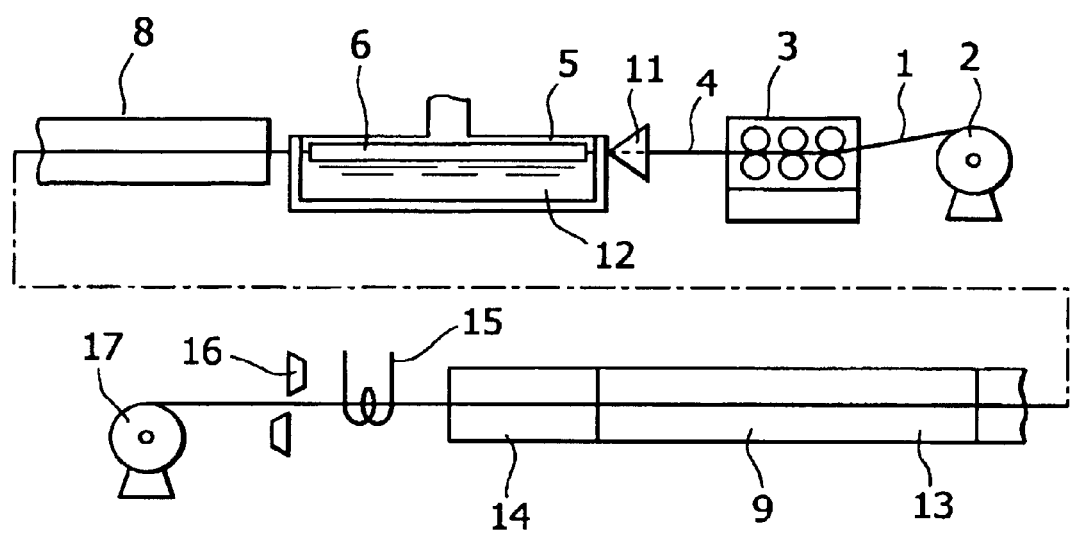
FIG. 1 is a schematic elevation view of the double-ply metal tube making process.

An embodiment of the present invention is explained with reference to FIG. 1, which shows an outline of the manufacturing steps.

A tube material 1 is made of a metal material of 0.2 to 0.6 mm thickness, 20 to 100 mm width and 2,500 to 3,000 meter length, and is plated with copper, cupronickel, bronze, brass or the like at a thickness of 2 to 6 $\mu$m on both sides.

Figure 2:
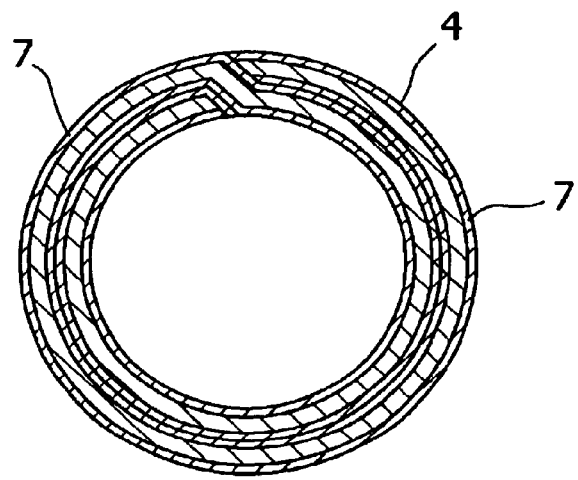
FIG. 2 is a cross-sectional view of a double-ply metal tube.

Unwinding the tube material 1 from an uncoiler 2, it is fed into a tube-making apparatus 3, and a double-ply metal tube 4 such as shown in FIG. 2 is formed. In this figure, 7 denotes the plating layer. The resulting double-ply metal tube 4 is immersed and heated in a neutral or reducing molten salt bath 6 of high temperature in a heating furnace 5, and the plating layers 7 of the overlapping faces of the tube material 4 are melted and fused together.

Because this lets a chloride thin film adhere to the circumference of the welded double-ply metal tube, it is removed by passing the tube through an auxiliary heating furnace 8, and the tube is cooled with a cooling device 9 that is linked thereto, and wound with a recoiler 17, or cut into the necessary dimensions. If the chloride thin film cannot be removed by passing through the auxiliary heating furnace 8, then it is removed by brushing or air blowing after passing through the cooling device.

In the above steps, the heating furnace 5 is for example 5 to 25 m long and is kept at a temperature of 900 to 1200° C., and preferably at a temperature of 1110 to 1150° C. The neutral or reducing molten salt bath of high temperature is kept at 900 to 1200° C., and preferably at 1110 to 1150° C.

The double-ply metal tube 4 is fed at a speed of 50 to 150 m per minute into the heating furnace 5, and immersed into the reducing molten salt bath for about 2 to 30 seconds.

The heating furnace 5 is provided at its inlet with a funnel-shaped receiving port 11, and inside the furnace, a guide pipe 12 of, for example, 50 mm diameter is provided that is straight or curved downward, and this pipe is also permeated by heated molten salt of high temperature. In this situation, the permeation of the molten salt can be aided by opening a suitable number of holes in the guide pipe 12, to an extent that preserves the strength of the pipe. The double-ply metal tube 4 is immersed in the molten salt bath 6 by leading it through the pipe 12 from the receiving port 11, and is retrieved from the furnace after heating it.

During that time, the copper, cupronickel, bronze or brass on the surface of the tube material is welded together between the double-ply material.

As for the heating, the double-ply metal tube 4 can be immersed into the bath 6 and heated, while letting the molten salt bath 6 overflow from the furnace 5. For this, the molten salt must be supplied somewhat in excess to the furnace 5 by a circulation means not shown in the figures. Although not shown in the figures, if using a guide pipe that is sloped downward, it is possible to heat the tube without letting the molten salt bath 6 overflow from the furnace.

The double-ply metal tube 4 should be immersed and heated in the molten salt bath 6, but this can be accomplished by any means.

The double-ply metal tube leaving the heating furnace 5 enters a high-temperature auxiliary furnace 8 of, for example, about 10 m length. This furnace is filled with a neutral or reducing gas, for example DX gas ($N_2$, $CO_2$ or $H_2O$ gas including 8 to 10% of CO or $H_2$), and is kept at 1110 to 1150° C.

Inside this high-temperature auxiliary furnace 8, the chloride thin film adhering to the surface of the double-ply metal tube 4 is eliminated.

Then, it is cooled with a cooling device 9 provided at the rear of the auxiliary furnace 4. Air or water is used as the refrigerant. The cooling device 9 has a total length of, for example, 50 m, and cools in stages using an air cooler (of for example 35 m length) in a first stage 13 and an indirect water cooler (of for example 15 m length) in a second stage 14.

The tube leaving the cooling device 9 passes through an eddy current flaw detector 15. This flaw detector 15 detects disturbances in the magnetic field emanating from the flaw detector when there are abnormalities in the tube, and thus its function is to discover, for example, alloy particles of iron and copper adhering to the surface of the tube, and to find gaps (voids) inside the seams or peeling at the end of the seams (loose seams).

Then, the tube is wound up with the recoiler 17 or cut into the necessary dimensions with a cutter 16, thus finishing the product.

The following illustrates one working example.

A tube material 1 made of steel of 0.335 mm thickness, 27.7 mm width and 2,700 m length, plated on both sides with copper at a thickness of 3 $\mu$m, is fed into a common tube-making apparatus 3 while unwinding it from an uncoiler 2. For the tube-making apparatus, the one disclosed in U.S. Pat. No. 2,292,810 can be used, for example.

Formed into a tube, the double-ply steel tube 4 has a diameter of 4.76 mm, and is fed at a speed of 150 m per minute into a continuous heating furnace 5. The heating furnace 5 has a length of 12 m, and in it, a bath 12 of $BaCl_2$, $MgF_2$, $B_2O_3$ (product name HS1100 by Parker Netsushori Kogyo, Co. Ltd.) kept at 1125° C. is formed.

While the double-ply steel tube 4 fed into the furnace passes through the guide tube 6, it is heated for about 5 seconds by the above-described molten salt bath.

The double-ply steel tube 4 leaving the continuous heating furnace 5 enters a high-temperature auxiliary furnace 8 of 10 m length. This furnace is filled with DX gas, and is kept at 1125° C. In the high-temperature auxiliary furnace 8, the double-ply steel tube 4 is heated for about 4 seconds. Then, it is introduced from the high-temperature auxiliary furnace 8 into the cooling device 9, where it is cooled.

The resulting product is passed or not passed through an eddy current flaw detector, and wound in portions of about 600 m around a recoiler 17. The wound product can be subjected to a helium leak test, for example. In such a helium test, helium gas is sealed into the tube at a pressure of 20 to 30 kg/cm$^2$, the tube is put into a vacuum container, which is then evacuated. In this situation, if there are holes in the tube, the helium leaks out from them, so that it is detected by a helium detector, and defects in the tube can be detected by this test method. This test makes it possible to guarantee 100% welding quality.

The present invention is configured as described above, so that it brings about the following effects.

The number of operators can be reduced considerably, because the tubes can be produced at high speeds with all steps in continuation. The welding time is short, so that no cavities are formed during the welding, and homogenous welding is possible. The tube is not cut into short pieces of 30 to 50 m, so that the cutting loss on both ends can be reduced to 2.5% of the total.

It is not necessary to apply black paint to prevent copper dripping, because the welding time is short, and the factory environment is favorable, because no carbon dust is generated by the heating.

Furthermore, a large factory space does not have to be provided, because long tube storage facilities are unnecessary.

Moreover, with the above-described method, the phenomenon that molten copper turns into particles due to its surface tension (in factories, this is called steel dripping) does not occur, because the molten salt forms a thin film that covers the surface of the double-ply metal tube.

Moreover, when the metal tube leaves the molten salt bath, the thin film of molten salt on it prevents its oxidation, the finish of the metal tube is good, and being glossy, the plating "sits" well.

Moreover, if the double-ply metal tube is wound directly around the incoiler 17 without passing it through the flaw detector 15 or the cutter 16, it can be subjected to the helium test, and the welding quality can be guaranteed.

What is claimed is:

1. A method for the continuous high-speed welding of a double-ply metal tube, comprising:

immersing the double-ply metal tube in a bath comprising at least one neutral or reducing molten salt selected from the group consisting of $BaCl_2$, and mixtures of $BaCl_2$ with one or more of NaCl, $MgF_2$, $B_2O_3$ and Ca—Si as a heating medium and maintaining the molten salt bath at 900 to 1200° C. to bond the tube.

2. A method for the continuous high-speed welding of a double-ply metal tube, comprising the steps of:

forming a double-ply metal tube by feeding a strip-shaped metal material that has been subjected to metal plating on both sides into a tube-making apparatus;

feeding the formed double-ply metal tube into a continuous heating furnace with a neutral or reducing molten salt bath as the heating medium and immersing the double-ply metal tube in the molten salt bath at a temperature of 900 to 1200° C. using at least one neutral or reducing molten salt selected from the group consisting of $BaCl_2$, and mixtures of $BaCl_2$ with one or more of NaCl, $MgF_2$, $B_2O_3$ and Ca—Si to bond the tube;

thereafter feeding the double-ply metal tube into a high-temperature auxiliary furnace with a reducing atmosphere; and cooling the resulting double-ply metal tube.

* * * * *